(12) United States Patent
Lam

(10) Patent No.: US 9,004,411 B2
(45) Date of Patent: Apr. 14, 2015

(54) MECHANICAL CONTROL MIXER AND METHOD THEREFOR

(76) Inventors: Lawrence Lam, Los Altos Hills, CA (US); Michael Lam, legal representative, Los Altos Hills, CA (US)

( * ) Notice: Subject to any disclaimer, the term of this patent is extended or adjusted under 35 U.S.C. 154(b) by 153 days.

(21) Appl. No.: 13/885,630

(22) PCT Filed: Nov. 15, 2011

(86) PCT No.: PCT/US2011/060825
§ 371 (c)(1),
(2), (4) Date: Jul. 16, 2013

(87) PCT Pub. No.: WO2012/068136
PCT Pub. Date: May 24, 2012

(65) Prior Publication Data
US 2014/0001313 A1    Jan. 2, 2014

Related U.S. Application Data

(60) Provisional application No. 61/413,675, filed on Nov. 15, 2010.

(51) Int. Cl.
*B64C 13/04* (2006.01)
*B64C 13/30* (2006.01)
*B64C 13/28* (2006.01)

(52) U.S. Cl.
CPC .............. *B64C 13/04* (2013.01); *B64C 13/30* (2013.01); *B64C 13/28* (2013.01)

(58) Field of Classification Search
USPC .................................. 244/221, 223, 232, 234
See application file for complete search history.

(56) References Cited

U.S. PATENT DOCUMENTS

| | | | | |
|---|---|---|---|---|
| 2,880,832 A * | 4/1959 | Apel | ............................. | 192/3.62 |
| 3,006,205 A * | 10/1961 | Platt | ................................. | 74/125 |
| 3,120,935 A * | 2/1964 | Perrin | .......................... | 244/90 R |
| 3,729,272 A * | 4/1973 | Lemont | .......................... | 416/114 |
| 3,738,594 A * | 6/1973 | Donovan et al. | ............. | 244/76 R |
| 4,071,208 A * | 1/1978 | Baker | ............................ | 244/221 |
| 4,244,541 A * | 1/1981 | Dorn | ............................. | 244/221 |
| 5,058,825 A * | 10/1991 | Rabouyt | .................... | 244/17.25 |
| 5,100,081 A * | 3/1992 | Thomas | ........................ | 244/220 |
| 5,878,981 A * | 3/1999 | Dewey | .......................... | 244/190 |
| 5,911,390 A * | 6/1999 | Pohling | ........................ | 244/223 |
| 5,924,331 A * | 7/1999 | Pohling | ........................ | 74/501.6 |
| 6,079,672 A * | 6/2000 | Lam et al. | ..................... | 244/217 |

(Continued)

OTHER PUBLICATIONS

PCT Search Report and Written Opinion under date of mailing of Jun. 15, 2012 in connection with PCT/US2011/060825.

*Primary Examiner* — Christopher P Ellis
*Assistant Examiner* — Medhat Badawi
(74) *Attorney, Agent, or Firm* — Quarles & Brady LLP (57) ABSTRACT

A mechanical control mixer configured to couple to an aircraft is provided. An axle is mounted to a frame of the mechanical control mixer, and a barrel is configured to rotate about the axle. A central rod is disposed within the barrel. The central rod is configured to rotate with respect to the barrel. A roll control input is connected to the central rod. The roll control input is configured to cause the central rod to rotate within the barrel. Output control rods are connected to the central rod. The output control rods are connected to at least one control surface of the aircraft. An air brake input is connected to the barrel. The air brake input is configured to cause the barrel to rotate about the axle to move at least one of the output control rods.

13 Claims, 8 Drawing Sheets

(56) References Cited

U.S. PATENT DOCUMENTS

| | | | |
|---|---|---|---|
| 6,554,229 B1 * | 4/2003 | Lam et al. | 244/217 |
| 6,675,076 B1 * | 1/2004 | Moody | 701/11 |
| 6,929,222 B2 * | 8/2005 | Djuric | 244/220 |
| 7,229,047 B1 * | 6/2007 | Nelson et al. | 244/99.2 |
| 7,367,532 B2 * | 5/2008 | Libby | 244/216 |
| 8,074,940 B2 * | 12/2011 | Kopp | 244/229 |
| 8,876,044 B2 * | 11/2014 | Cazals et al. | 244/87 |
| 2005/0178926 A1 * | 8/2005 | Nagayama et al. | 244/221 |
| 2006/0175468 A1 * | 8/2006 | Huynh et al. | 244/212 |
| 2009/0146018 A1 * | 6/2009 | Konig | 244/221 |
| 2009/0230252 A1 * | 9/2009 | Daunois et al. | 244/234 |
| 2010/0305780 A1 * | 12/2010 | Sataka | 701/3 |
| 2013/0031997 A1 * | 2/2013 | Caravella | 74/471 R |
| 2013/0334363 A1 * | 12/2013 | Lam et al. | 244/99.3 |
| 2014/0001313 A1 * | 1/2014 | Lam et al. | 244/221 |

* cited by examiner

MECHANICAL CONTROL MIXER AND METHOD THEREFOR

CROSS-REFERENCE TO RELATED APPLICATIONS

This application represents the national stage entry of PCT International Application No. PCT/US2011/060825 filed Nov. 15, 2011, which claims the benefit of U.S. Provisional Patent Application Ser. No. 61/413,675, filed on Nov. 15, 2010, both of which are incorporated herein by reference in their entirety for all purposes.

FIELD

Various implementations of the present invention, and combinations thereof, are related to mechanical control systems and, more particularly, to a mechanical control mixer for aircraft control surfaces.

BACKGROUND

The flight of an aircraft can be modified using flight control surfaces that are connected to the aircraft's wing. The control surfaces include ailerons, flaps, and spoilers that can be used to roll the aircraft, provide additional lift, and/or control airspeed of the aircraft.

An aileron is a hinged panel on the trailing edge of the wing, usually located at the outboard portion of the wing. The aileron can either be raised or lowered to decrease or increase lift on the wing. When deflected downwardly, the aileron increases the lift of the wing, to roll or bank the airplane into a turn. At the same time, the aileron on the other wing is deflected upwardly, to decrease the lift on that wing to augment the rolling motion.

Flaps are surfaces that are mounted at the trailing edge of each wing. During high-speed flight, the flaps are retracted underneath the wing and do not usually contribute to the aerodynamic characteristics of the wing. During low speed flight, however, the flaps can be deployed from the trailing edge of the wing to modify the shape of the wing to increase lift.

Generally, the flaps increase the wing's camber—the degree of asymmetry between the top surface and bottom surface of the wing. Although deployed flaps create drag, the flaps can be used during take-off or landing to increase lift and to allow for flight at slow speed. In some aircraft, the flaps are deployed on a rail or track system that allows the flaps to extend away from the trailing edge of the wing, thereby increasing both the wing's camber and surface area. Generally, flaps cannot be moved and cannot be used as control surfaces to roll or bank the aircraft. Instead, those actions are implemented using ailerons.

One of the most objectionable features of conventional aileron applications is a phenomenon referred to as "adverse yaw." When a turn is initiated with conventional ailerons, the nose of the airplane turns first in a direction opposite to that of the intended turn. This is usually compensated for by using rudder deflection to coordinate the turn. The adverse yawing motion is a direct result of aileron application. While producing more lift to bank the airplane into a turn, the downwardly-deflected aileron also produces more drag, which acts momentarily to cause the airplane's nose to turn in the direction opposite to the intended turn. That is, when one wing is lifted relative to the other wing by operation of a conventional aileron to bank the airplane into a turn, it is also pulled back away from the turn relative to the wing on the other side, causing the nose initially to turn, or yaw, in the direction opposite to the turn. This effect becomes increasingly detrimental as the roll rate increases and/or airspeed decreases.

In addition to resulting in inefficient flight, adverse yaw produced by the conventional aileron often contributes to spin entry. When spinning, an airplane is descending and turning in a tight spiral flight path. In a left hand spin, for example, the left wing is down and toward the center of the spiral. Instinctively, many pilots are tempted to initiate right stick or control yoke movement to roll towards the right and out of the spin. With conventional ailerons this action deploys the left aileron down and the right aileron up. The left aileron may create more drag and the spin will be further aggravated.

Another disadvantage of conventional ailerons is that they also require commitment of a sizable portion of the trailing edge of the wing that could otherwise be used for beneficial high-lift devices such as flaps that would allow lower approach, landing and takeoff speeds, especially advantageous for heavy, high-speed commercial and high-performance military aircraft. Because, conventional ailerons are moved upwards and downwards, they cannot be placed above conventional flaps which are, generally, incapable of movement. As a result, different regions of the trailing edge of a wing are separately used for either aileron or flap placement.

In view of the draw-backs of conventional aileron and flap configurations, an improved aircraft aileron system has been developed. The improved aileron system is described in U.S. Pat. No. 6,079,672 to Lam, et al. and U.S. Pat. No. 6,554,229 to Lam, et al. and includes two independent panels located at the rear portion of the wing. The panels are located in a span-wise direction and aligned with the wing's trailing edge. The panels are independently hinged at their leading edges and are configured to rotate to create angular deflections with respect to the wing. The upper panel (the "aileron panel") may be restricted to upward deflection only from its neutral position and in operation is deployed independently as an aileron. The lower panel (the "flap panel") is capable of both upward and downward deflections from its neutral position, and is deployed independently downward as an auxiliary flap. Both panels are deployed together upwardly only as an aileron. Alternatively, the auxiliary flap panel is capable of downward deployment only, to provide a simpler aileron system. For roll control of an aircraft during cruise, the aileron panel on one side only is deflected up while the aileron panel on the other side remains close-to or in its neutral position.

In both conventional and dual-panel aileron control surface implementations, the ailerons may be configured to deflect upward simultaneously on both wings to act as air brakes. To minimize upward pitch of the aircraft during air braking, the ailerons may be engaged in conjunction with a partial downward deployment of flap panels. By using a controlled deployment of the flap panels during air braking, the pitching moment can be minimized resulting in a controlled slowing of the aircraft.

When using a combination of aileron and flap during air braking, aircraft roll control can be maintained by superimposing differential deflection of the upwardly-deflected aileron panels. For example, during air braking, to bank the aircraft to the right, the angle of deployment of the starboard upwardly-deployed aileron can be increased, while the angle of deployment of the port upwardly-deployed aileron can be decreased. Additionally, the same control logic may allow simultaneous control of the aircraft around the aircraft's vertical or z-axis (i.e., yaw control) by deploying a combination of flap panel and aileron panel of each wing asymmetrically.

For example, to yaw the aircraft during air braking, the deployment of both the aileron and flap panel on one side of the aircraft can be increased, while the deployment of both the aileron and flap panel on the other side of the aircraft can be decreased. Besides providing an additional control mode for conventional aircraft with empennage, this may be highly desirable for aircraft lacking a conventional rudder such as a flying wing.

To control each of the aircraft's control surfaces, a pilot is provided with several flight control mechanisms. The control mechanisms may include levers, wheels, rudder pedals, or yokes and collectively allow a pilot of the aircraft to control a position of each of the control surfaces on the aircraft. When making a turn, for example, a pilot manipulates the ailerons of the aircraft to initiate a bank, while also operating the aircraft's rudder to minimize adverse yaw.

Often, a pilot may provide multiple inputs to a single control surface. For example, if a pilot wishes to implement air braking and bank the aircraft at the same time, the maneuver requires the pilot to manipulate two separate controls—the air brake control and roll control. In order to communicate the pilot's multiple control inputs to the single activated control surface, there is a need for a mechanical control mixer configured to combine multiple control inputs into a single output that is communicated to a single aircraft control surface or combination of control surfaces.

SUMMARY OF THE INVENTION

Various implementations of the present invention, and combinations thereof, are related to mechanical control systems and, more particularly, to a mechanical control mixer for aircraft control surfaces.

In one implementation, the present invention is an aircraft. The aircraft includes a mechanical control mixer coupled to the aircraft. The mechanical control mixer includes an axle mounted to a frame of the mechanical control mixer, a barrel configured to rotate about the axle, and a central rod disposed within the barrel. The central rod is configured to rotate with respect to the barrel. A roll control input is connected to the central rod. The roll control input is configured to cause the central rod to rotate within the barrel. Output control rods are connected to the central rod. The output control rods are connected to at least one control surface of the aircraft. An air brake input is connected to the barrel. The air brake input is configured to cause the barrel to rotate about the axle to move at least one of the output control rods.

In another implementation, the present invention is a mechanical control mixer. The mechanical control mixer includes a barrel connected to the mechanical control mixer. The barrel is configured to rotate within the mechanical control mixer in response to an air brake input. The control mixer includes a central rod disposed within the barrel. The central rod is configured to rotate within the barrel in response to a roll control input to control a position of at least one control surface of an aircraft.

In another implementation, the present invention is a control mixer. The control mixer includes a first element configured to rotate about a first plane to supply a differential input to at least a pair of control surfaces of an aircraft, and a second element configured to rotate about a second plane to supply a matched input to the at least a pair of control surfaces of the aircraft.

BRIEF DESCRIPTION OF THE DRAWINGS

Implementations will become more apparent from the detailed description set forth below when taken in conjunction with the drawings, in which like elements bear like reference numerals.

DETAILED DESCRIPTION

The present invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

In an aircraft, one or more control mechanisms may be used to control the aircraft's control surfaces and, thereby, the flight attitude of the aircraft. The control mechanisms may be mechanical (e.g., control levers, wheels or yokes), and may be connected to rods, tension cables, or pulleys that are mechanically coupled to the aircraft's control surfaces. Mechanical gears may be integrated into the control systems between the control input device and the control surface to control an amount of input force required to move a particular control surface. In general, aircraft control systems that control one or more aircraft control surfaces in response to two or more pilot control inputs are referred to as "mechanical mixers."

The present system provides a mechanical control mixer for positioning control surfaces of an aircraft. The control mixer can receive and process multiple control inputs such as a combination of roll control input as well as air brake input. The roll control input may be provided via rotation of a control wheel or yoke, while the air brake input may be provided by movement of a control lever, for example. In other implementations, however, the present control mixer may be used to control a position of any of the available control surfaces or other aerodynamic features of an aircraft. For example, the present control mixer may be used to control any of spoilers, flaps, ailerons, or slats.

In one implementation, the control mixer can be used to both set a position of aircraft ailerons (e.g., as in an air braking configuration), and also provide differential deflection of each of the aileron panels (e.g., such as when rolling an aircraft during air braking or yawing). The present control mixer automatically applies the differential deflection input to each of the aileron panels without requiring additional input from a pilot during air braking.

Figure 1A:
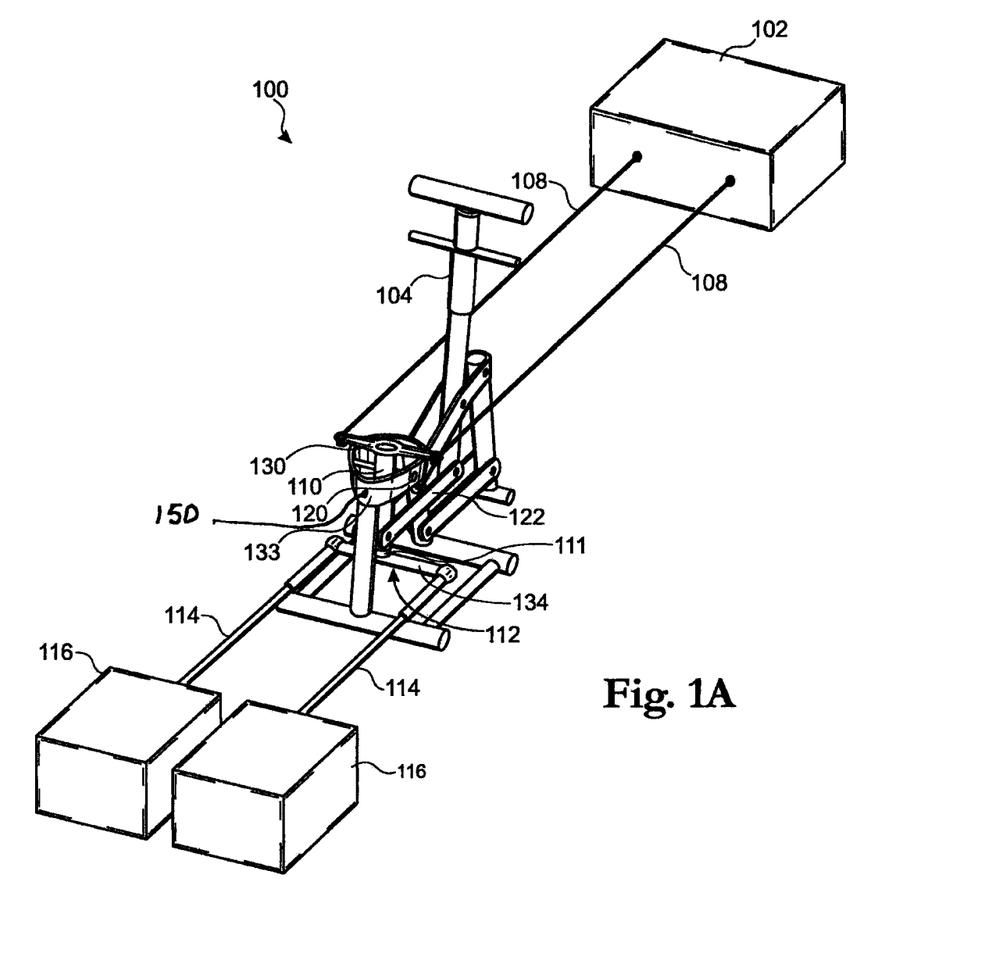
FIG. 1A is an illustration of a control mixer for integrating flight control inputs configured to combine roll control and air brake control inputs.

FIG. 1A is an illustration of control mixer 100 for integrating flight control inputs. As shown in FIG. 1A, control mixer 100 is configured to receive both roll control input 102 and air brake input 104. On FIG. 1A, roll control input 102 is shown as a 'black box', but may be replaced with any appropriate mechanical or electro-mechanical control input connected to each of control rods or cables 108. In response to roll control and/or air brake pilot inputs, control mixer 100 generates a single mechanical output that can be communicated to each of an aircraft's aileron panels. In one implementation, in addition to controlling the aileron panels, given a particular air brake input, the control mixer may be configured to transmit a control signal to one or more of the aircraft's flaps to simultaneously control a position of the aircraft's flap panels, for example, during air braking.

In FIG. 1A, roll control input is applied to control mixer 100 by control rods or cables 108. As the pilot manipulates roll control device 102 (e.g., a wheel, yoke, or stick), roll control device 102 pulls on either one of the port or starboard operating cables 108. In turn, the port or starboard operating cable causes a central rod of barrel 110 to rotate within mixer 100. As central rod 111 of control mixer 100 rotates (for example, in a first plane), that rotation is communicated to the output portion 112 of control mixer 100, which also rotates in the same plane. The output portion 112 of control mixer 100 is connected to output control rods or cables 114 which are, in turn, connected to ailerons 116 of the aircraft. In FIG. 1A, the aircraft's ailerons are shown as 'black boxes.' Boxes 116 may represent a direct mechanical connection between control rods or cables 114 and the aircraft's ailerons, or an electro-mechanical connection formed between the aircraft's ailerons and control rods or cables 114. As output control rods or cables 114 are pulled by the rotation of central rod 111 of barrel 110, output control rods or cables 114 modify an angle of deployment of ailerons 116 of the aircraft. When output control rods or cables 114 are pulled, in one implementation the corresponding aileron is deflected upwards.

Figure 1B:
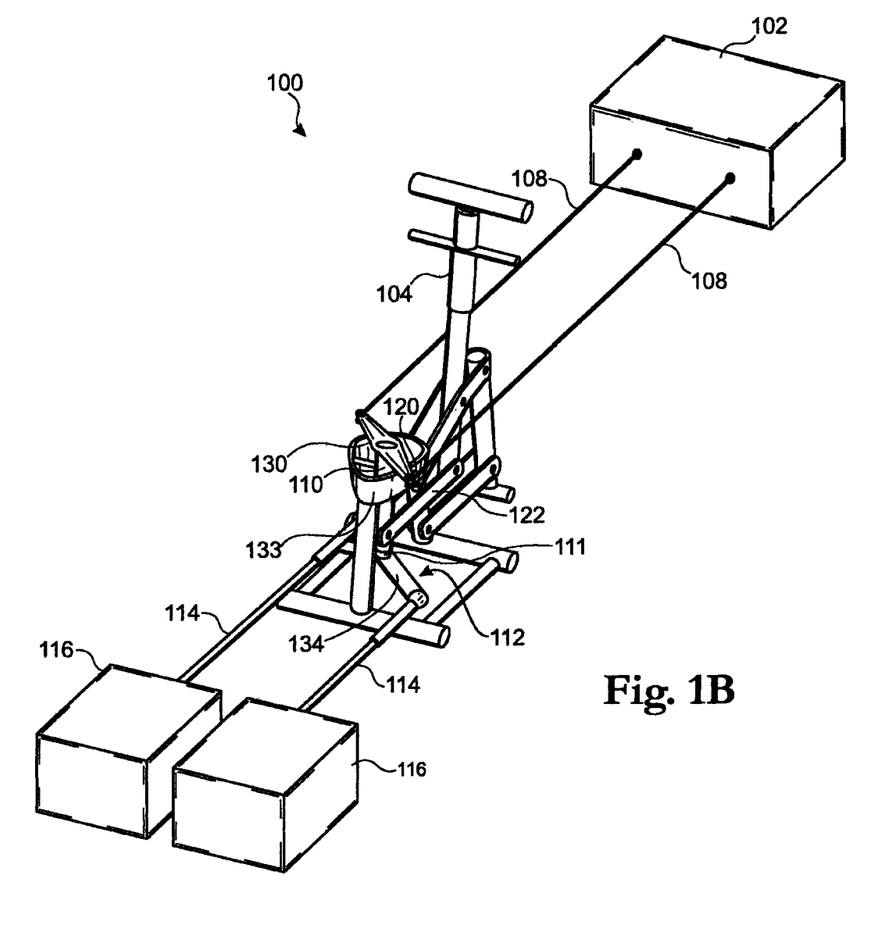
FIG. 1B is an illustration of the control mixer being subjected to a roll control input.

For example, FIG. 1B is an illustration of the control mixer being subjected to a roll control input. As shown, the pilot has applied a roll control input using roll control input 102. In this example, the input control rod or cable on the port side of the aircraft pulls on the top crank 130 of control mixer 100 causing central rod 111 of barrel 110 to rotate. As a consequence, the output stage 112 of mixer 100 pulls on the port output control rod 114 causing the port aileron to be deflected upwards, resulting in the aircraft rolling.

Figure 1C:
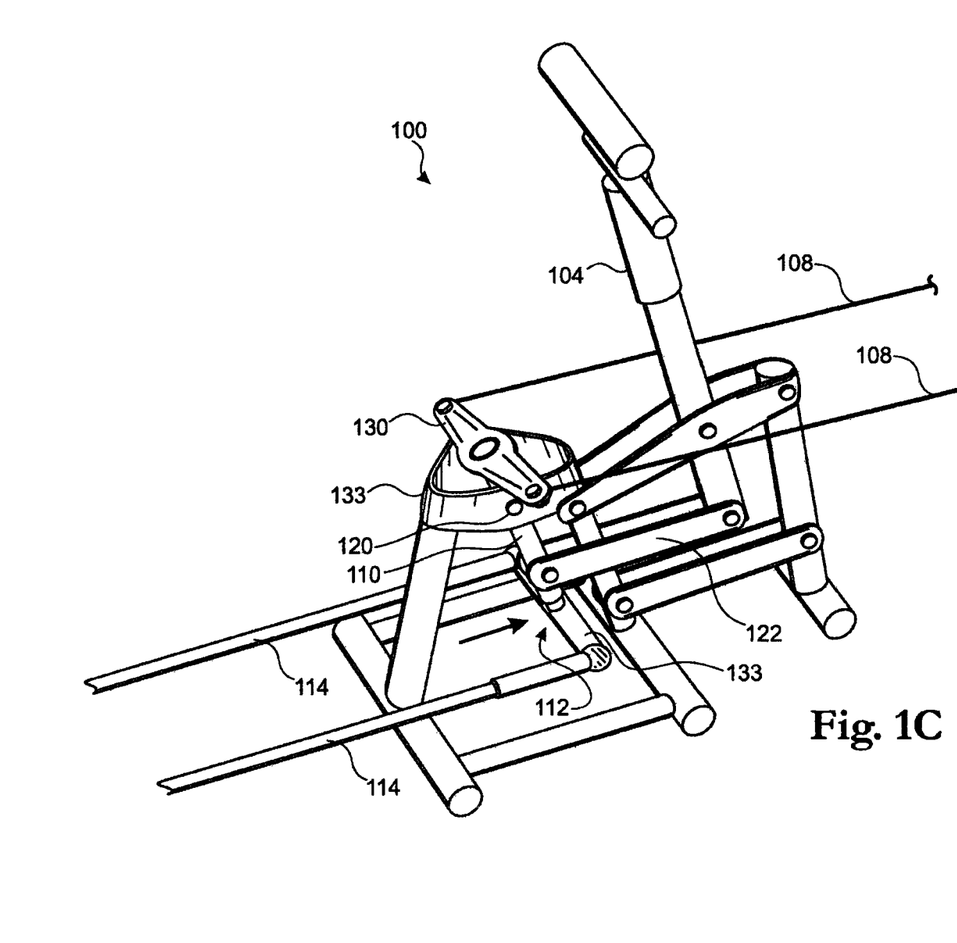
FIG. 1C is an illustration of a control mixer in an air brake configuration.

In addition to providing roll control inputs, at the same time the pilot may wish to provide an air brake input to control mixer 100 to slow the aircraft. FIG. 1C illustrates control mixer 100 in an air brake configuration. Generally, air braking is performed by moving both aileron panels upwards by the same degree (e.g., by pulling on both output control rods or cables 114 by an equal amount). Using the present control mixer, as the pilot applies the airbrake by moving airbrake control input 104 backwards, rod 122 pulls on the lower portion of barrel 110 of control mixer 100 causing it to rotate about pivot, axle, or mounting point 120 thereby moving the central rod of barrel 110. As a consequence, output stage 112 of barrel 110 moves forward, rotating in a plane that is approximately perpendicular to the plane of rotation of the central rod 111, and pulls equally on both of output control rods or cables 114, moving both control ailerons by the same amount. Accordingly, the air brake supplies each of output control rods or cables 114 with a matched input. That is, both output control rods or cables 114 are moved by the same distance. Note that airbrake control input 104 may be positioned proximate the control mixer, as illustrated in FIGS. 1A-1C and FIG. 5, airbrake control input 104 may be positioned some distance away from the control mixer, for example by extending the length of rod 122 or replacing rod 122 with a control cable.

During air braking, the aileron deflection amount is added to any pre-existing aileron deflection resulting from any roll control input. Accordingly, by repositioning the barrel of the control mixer using the air brake input, the pilot can bias a position of each of the ailerons causing them to act as airbrakes. At the same time, the pilot can super-impose a roll control input, causing the barrel of the control mixer to rotate and independently modify a position of each aileron for roll control.

Although the control mixer illustrated in FIGS. 1A-1C is configured to combine only two control inputs, in one implementation the mixer may be modified to process three inputs. In such an implementation, in addition to the two degrees of freedom shown in FIGS. 1A-1C (i.e., rotation resulting from roll control input 102 and movement of the barrel of the control mixer by air brake control 104), a pivot point or axle may be included to allow barrel 110 to rotate laterally within control mixer 100. In that case, a pivot point or axle may be formed within the frame of mixer 100 at point 150 (see FIG. 1A) with a rod passing through collar 133 to which barrel 110 is coupled. In that case, the rod passing through point 150 would allow the barrel to be rotated laterally, allowing for the lateral position of barrel 110 to be determined by a third control input. In that case, the lateral position of barrel 110 can be used to control one or more control surfaces of the aircraft.

Figure 2:
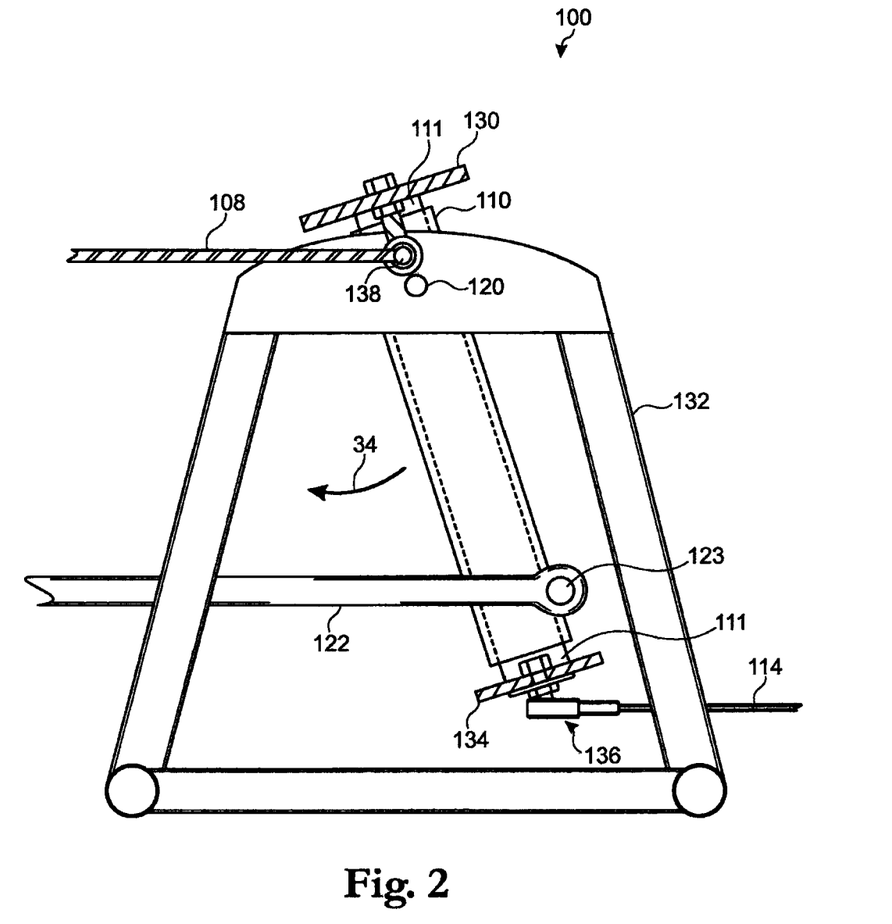
FIG. 2 is an illustration showing a side view of one example implementation of the present control mixer.

FIGS. 2-5 provide illustrations showing additional detail of mechanical control mixer 100. FIG. 2 is an illustration showing a side view of one example implementation of the present control mixer. Control mixer 100 includes frame 132 for supporting mixer 100 and providing a connection point for one or more of the components of mixer 100. The frame includes a suitable material configured to support the components of mixer 100 during flight such as steel, aluminum or carbon fiber. In some cases, to minimize the weight of mixer 100, frame 132 is manufactured using hollow, tubular components.

Barrel 110 is connected to frame 132 at mounting point 120 and is configured to rotate about mounting point 120. Central rod 111 is inserted through barrel 110 and is configured to rotate within barrel 110. Crank 130 is fixed to a top portion of central rod 111. Crank 130 includes mounting points 138 for connecting input control rods or cables 108 and rests upon barrel 110 allowing central rod 111 to rotate within barrel 110.

Figure 3:
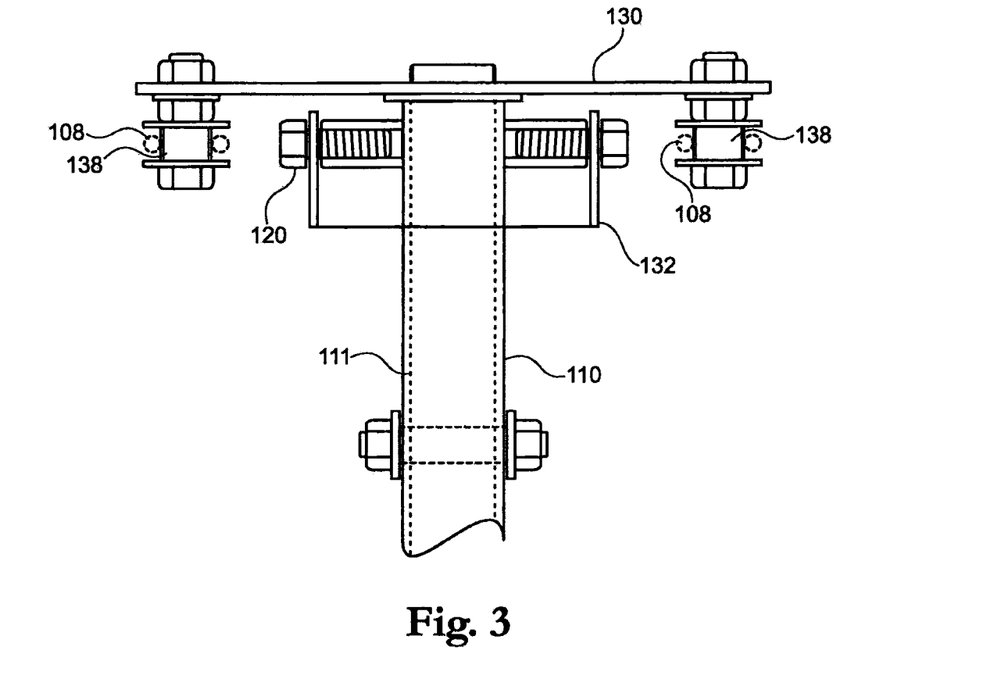
FIG. 3 is an illustration showing a front view and additional detail of the barrel, central rod and crank of the control mixer shown in FIG. 2

FIG. 3 is an illustration showing a front view and additional detail of barrel 110, central rod 111 and crank 130 of control mixer 100 of FIG. 2. In the depicted implementation, mounting points 138 are connected to crank 130, but are positioned below crank 130. As shown in FIG. 3, with neutral roll control input, mounting points 138 are positioned approximately level with mounting point 120 of barrel 110 in the horizontal plane. In that configuration, as barrel 110 rotates back and forth within control mixer 100, the tension of control cables 108 does not change. If mounting points 138 were not level with mounting point 120 of barrel 110, the act of applying the airbrakes by moving air brake control 104 (see FIGS. 1A-1C) would also move mounting points 138 backward or forward with respect to frame 132, causing a change in the tension of control rods or cables 108. In the configuration shown in FIG. 3, when barrel 110 rotates within control mixer 100 during air braking, mounting points 138 rotate, they tend not to move laterally within control mixer 100.

Figure 4:
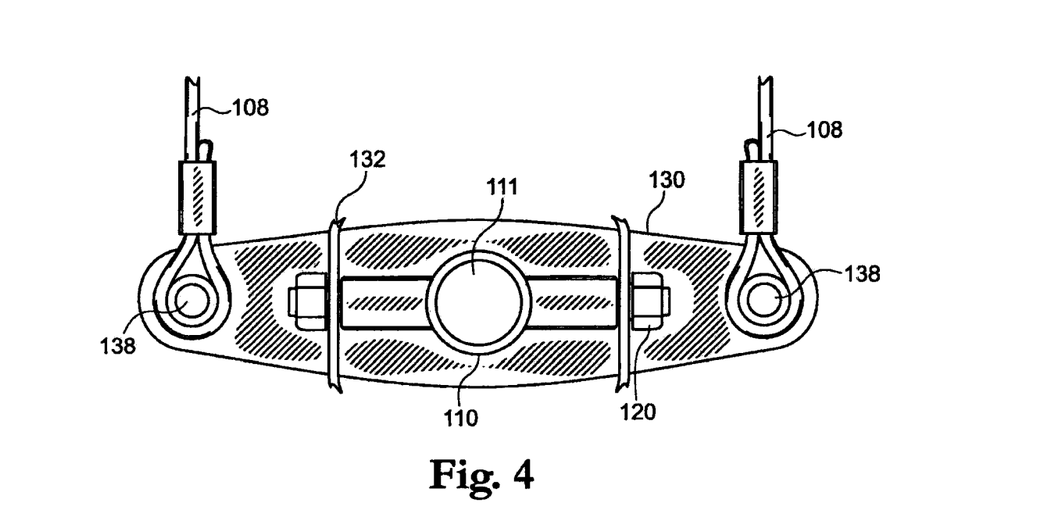
FIG. 4 is an illustration showing a bottom view and additional detail of the portion of the control mixer illustrated in FIG. 3

FIG. 4 is an illustration showing a bottom view and additional detail of the portion of control mixer 100 shown in FIG. 3. As shown in FIG. 4, central rod 111 passes through an interior volume of barrel 110. Crank 130 is connected to central rod 111 and includes mounting points 138 for connecting input control rods or cables 108.

Referring back to FIG. 2, crank 134 is fixed to a second end of central rod 111. As control input from a pilot is fed into control mixer 100 applying a force to control rods or cables 108 causing crank 130 to rotate, central rod 111 also rotates within barrel 110 causing crank 134 to rotate. Crank 134 includes mounting points 136 for connecting to control rods or cables 114 which are, in turn, connected to control surfaces of the aircraft. In the present example, control rods or cables 114 are connected to the ailerons of the aircraft. As crank 134 rotates, crank 134 pulls on one of control rods or cables 114 causing the aileron connected to that control rod or cable to be deflected accordingly.

In configurations where control rods or cables 114 include fixed rods, rotation of crank 134 causes crank 134 to pull on one of the control rods, while simultaneously pushing on the other control rod.

In the mechanical control mixer illustrated in FIG. 2, the input control rods or cables connected to crank 130 may be configured for roll control of the aircraft. As such, control inputs provided by a pilot of the aircraft to a mechanical roll control device are fed through the mixer and, ultimately, are communicated to the ailerons of an aircraft. By causing the roll control device to pull on one control rod or cable, a pilot can cause one of the aircraft's ailerons to be actuated (such as by deflecting upwards from the aileron's neutral position) to cause the aircraft to roll.

Airbrake control rod 122 is connected to barrel 110 at pivot 123. Airbrake rod 122 may be connected to an appropriate mechanical control device for activation by a pilot. To apply air brakes, the pilot uses the mechanical control device to pull on airbrake rod 122 and, consequently, barrel 110 of mixer 100. The airbrake input causes barrel 110 to rotate about pivot 120 in the direction of arrow 34 on FIG. 2. As barrel 110 rotates about pivot 120, central rod 111 and crank 134 move forward within the control mixer. As crank 134 moves forward, both of control rods or cables 114 pull equally on the connected ailerons causing an equal movement of the ailerons. This equal movement causes the ailerons to operate as air brakes.

Using the present control mixer, the air brake may be used even when the ailerons are not equally deployed, such as when the aircraft is rolling or banking. While rolling, for example, control rod 111 and the connected cranks 130 and 134 may be partially rotated within control mixer 100 resulting in a differential deployment of the aircraft's ailerons. If the pilot wishes to use the air brake during the roll, the pilot uses the mechanical air brake control device to pull on barrel 110 of mixer 100. As the airbrake control is applied and barrel 110 moves forward within control mixer 100, even if crank 134 is not in a neutral position, the connection points (e.g., mounting points 136 of FIG. 2) of both of control rods or cables 114 each move forward by an equal distance causing both aileron panels to move by the same amount. As a result, the application of air brakes causes an equal change in the position of both aircraft ailerons, even if both ailerons are not in the same starting position (such as when rolling or banking).

Figure 5:
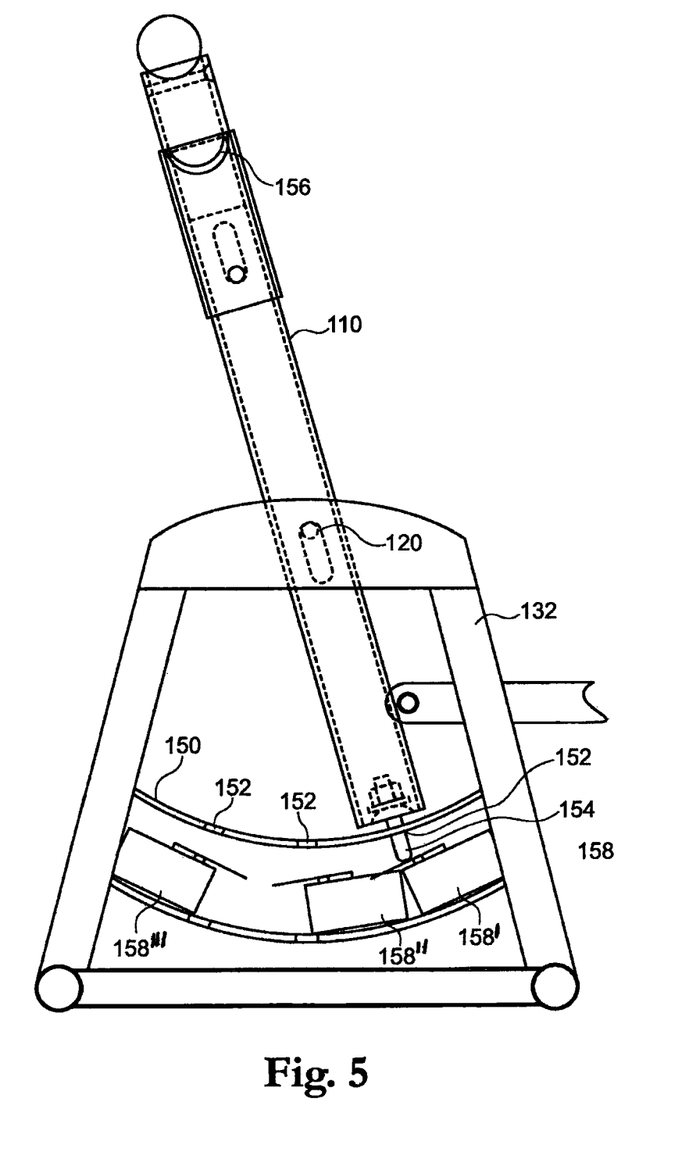
FIG. 5 is an illustration of an alternative implementation of the frame of the control mixer of FIG. 2 with an air brake control integrated into the barrel portion of the present control mixer for simultaneous deployment of flaps during air braking.

FIG. 5 is an illustration of an alternative implementation of the frame of the control mixer of FIG. 2 with an air brake control integrated into the barrel portion of the present control mixer for simultaneous deployment of flaps during air braking. FIG. 5 does not show input or output control cables or cranks 130 or 134. As shown in FIG. 5, frame 132 includes stop plate 150 mounted within frame 132 beneath barrel 110. Stop plate 150 is configured with several holes 152 that define a series of air brake settings. Pin 154 is mounted within barrel 110 and is configured to be retracted into an interior portion of barrel 110 using air brake control handle 156.

To lock a position of barrel 110 within frame 132 (i.e., to prevent rotation of barrel 110 around mount point 120 and to set a particular aileron air braking bias), pin 154 is extended into one of holes 152 of stop plate 150. For example, in FIG. 5, barrel 110 is shown locked in a position resulting in a neutral deployment of the aircraft's ailerons (i.e., with no air braking being implemented). If, however, the pilot wishes to initiate air braking, the pilot pulls on air brake control handle 156 causing pin 154 to be retracted from stop plate 150 into barrel 110. Barrel 110 can then be rotated about pivot point or axle 120 causing the lower portion of barrel 110 to move forward or backward within the control mixer. As the lower portion of barrel 110 moves within the control mixer frame, the lower crank of the central rod (not shown in FIG. 5, but see crank 134 of FIG. 2) moves applying an equal force to both aileron control rods or cables (not shown) to implement air braking. Air brake control handle 156 can then be released, allowing pin 154 to be extended into one of the holes 152 of stop plate 150, thereby locking barrel 110 in position.

Because the deployment of air brakes using ailerons may cause the aircraft to pitch upwards, the present control mixer may be configured to simultaneously deploy the aircraft's flaps to counteract the pitching movement. As shown in FIG. 5 a plurality of flap control switches 158 may be positioned beneath each of the holes of stop plate 150. As barrel 110 is locked into a particular air braking position (or, alternatively, a neutral position) by extending pin 154 into the appropriate hole 152 of stop plate 150, pin 154 trips the corresponding switch 158. Each switch 158 may be configured to cause a flap deployment system to deploy a particular amount of flaps in compensation for the simultaneous deployment of the ailerons during air braking. Referring to FIG. 5, switch 158' is located at a neutral point with no air braking. Accordingly, when triggered, switch 158' causes the aircraft's flaps to move to their neutral position. Switch 158", however, is located under the particular hole 152 of stop plate 150 that results in a 25 degree deployment of ailerons for air braking. In compensation, switch 158" causes a 20 degree deployment of flaps in compensation. Similarly, switch 158''' is located under hole 152 of stop plate 150 resulting in a 45 degree deployment of ailerons for air braking. Again, in compensation, switch 158''' causes a 35 degree deployment of flaps in compensation. In other implementations of the present system, alternative mechanisms may be used for detecting a position of barrel 110 within control mixer 100 to simultaneously control a deployment of the flaps. Also, in other implementations a different number of holes may be formed within the stop plate, with each hole having a corresponding switch or other detection mechanism configured to cause a different degree of aileron deployment.

Some aircraft are configured to use a dual-panel aileron system as described in U.S. Pat. No. 6,079,672 to Lam, et al. and U.S. Pat. No. 6,554,229 to Lam, et al. The dual-panel aileron systems include two independent panels located at the rear portion of the wing. The panels are independently hinged at their leading edges and are configured to rotate to create angular deflections with respect to the wing. The upper panel (the "aileron panel") may be restricted to upward deflection only from its neutral position and in operation is deployed independently as an aileron. The lower panel (the "flap panel") may be capable of both upward and downward deflections from its neutral position, and is deployed independently downward as an auxiliary flap. Both panels are deployed together upwardly only as an aileron. Alternatively, the auxiliary flap panel is capable of downward deployment only, to provide a simpler aileron system. For roll control of an aircraft during cruising flight, the aileron panel on one side only is deflected up while the aileron panel on the other side remains in or close to its neutral position.

Figure 6A:
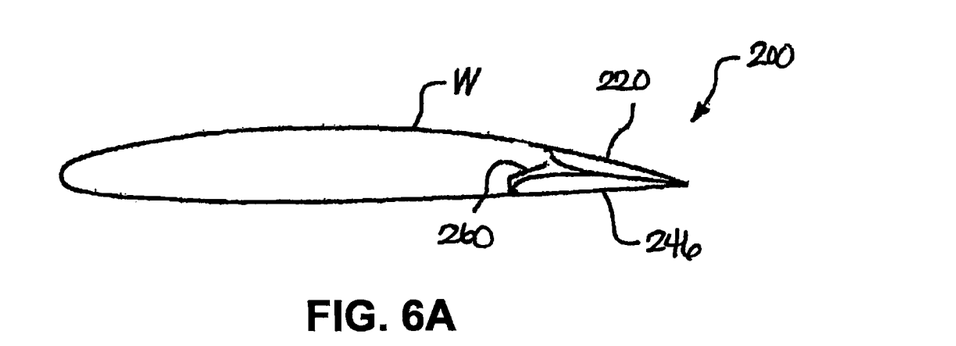
FIGS. 6A, 6B, and 6C each show a cross section, or an airfoil section, of a wing incorporating a dual-panel aileron system, illustrating different stages in the deployment of the dual-panel system.
Figure 6B:
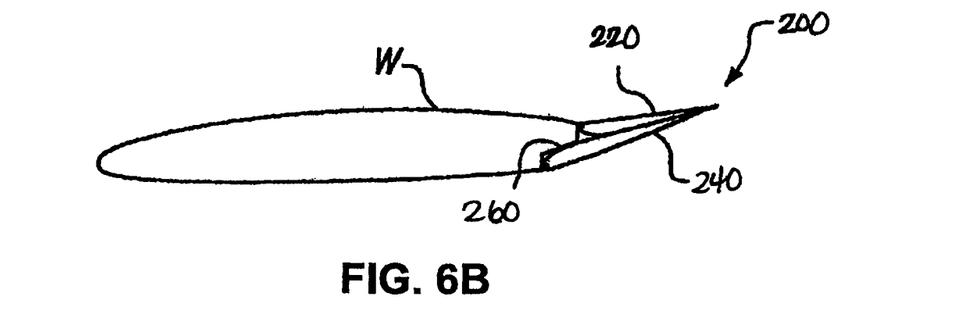
Figure 6C:
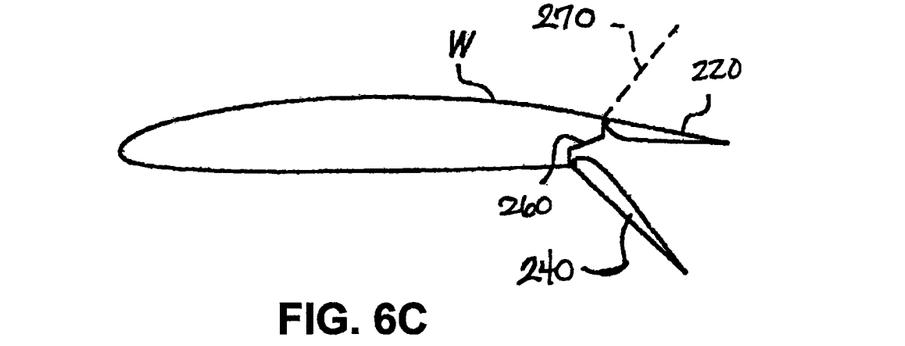

For example, FIGS. 6A, 6B, and 6C each show a cross section, or an airfoil section, of a wing W incorporating a dual-panel aileron system 200, illustrating different stages in the deployment of the dual-panel system. The aileron system 200 is shown to include an upper aileron panel 220 and flap panel 240 stowed underneath the aileron panel. Both aileron panel 220 and flap panel 240 are separately hinged to the wing's rear spar 260 or other hard points attached to wing W, and can be operated independently, but can also be made to operate in unison for certain functions when they are engaged. In FIG. 6A, both panels are shown in their respective neutral or retracted positions, in which the panels form smooth continuations of the respective upper and lower surfaces of the wing W. With the aileron panel 220 deflected upwardly, as shown in FIG. 6B, the auxiliary flap panel 240 is also made to deflect upwardly to form an aerodynamically efficient "aileron" in the usual sense. In the present system, however, with the auxiliary flap panel 240 deployed downwardly, as shown in FIG. 6C, the aileron panel 220 can remain in the neutral position (shown in solid lines) or be deflected up only, as indicated by the broken line 270. Accordingly, the dual-panel aileron system, as shown in FIG. 6C, can use both available panels to provide the increased lift functionality of conventional flaps in addition to aileron control.

Alternatively, in addition to providing the fixed-flap and aileron functionality illustrated in FIGS. 6A, 6B, and 6C, the dual-panel system can be used in applications that include flap panels configured to be extended away from the trailing edge of wing W along a rail system or track.

In a dual-panel aileron configuration, as described above, roll control may be provided by the movement of only a single aileron panel upwards (without a corresponding downward deflection of the corresponding aileron panels as found in conventional configurations). In such a configuration, the output stage of the present control mixer may include cables or collapsible push rods rather than fixed push rods to ensure that the ailerons are not forced beyond their neutral position in a downwards direction as roll control input is supplied by a pilot.

If the output stage of the control mixer were connected to the ailerons using fixed rods, for example, as a roll input is supplied to the control mixer, one aileron would be raised, while the other would be forced downwards, past its neutral position. In a dual-panel aileron system, however, for roll control only a single aileron may be raised, and the other aileron is maintained in its neutral position. Accordingly, using collapsible rods, at the output stage of the control mixer, as an aileron panel is lowered to its neutral position, any additional control input that would ordinarily force the aileron downwards past its neutral position instead causes the control rod to collapse and the aileron is maintained in its neutral position.

Figure 7:
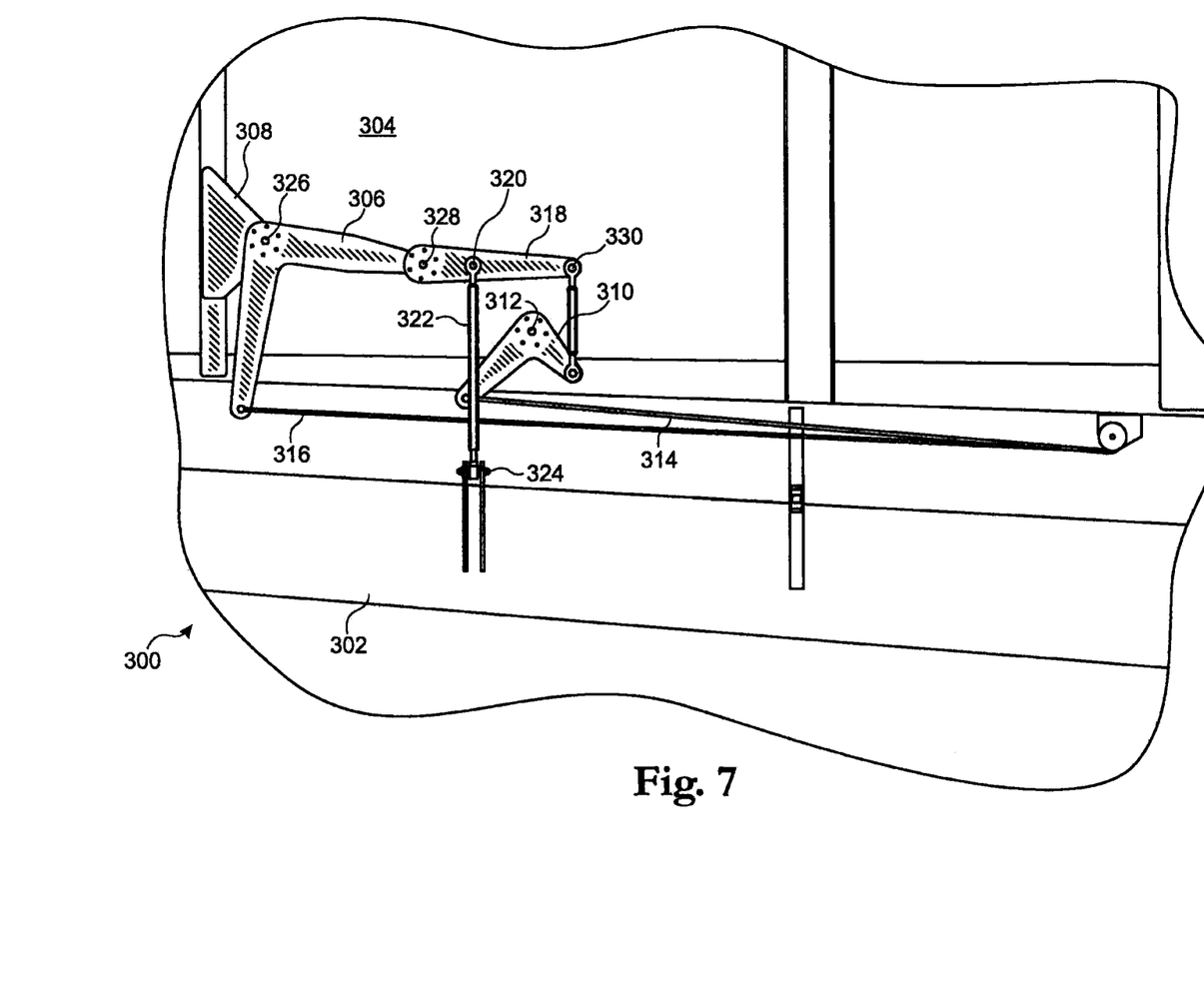
FIG. 7 is an illustration of a bottom view of a wing structure incorporating an alternative mechanical control mixer for controlling a control surface of an airplane.

FIG. 7 is an illustration of a bottom view of a wing structure incorporating an alternative mechanical control mixer 300 for controlling a control surface of an airplane. Although in the present example the control surface is described as an aileron, it is to be readily appreciated that the control mixer could be used to control any appropriate control surface of an aircraft. The mixer includes two bell cranks that may control a position of a connected aileron panel either independently or in combination. One of the bell cranks may be connected to an air brake control device for setting a bias position of the connected aileron panel, while the second bell crank may be connected to a roll control input.

FIG. 7 shows wing 304. Aileron 302 is hingedly connected to wing 304 and is either raised or lowered by pushing or pulling on pushrod 322. Pushrod 322 is connected to aileron panel 302 at hinge 324. As a force pulls on pushrod 322 (moving pushrod 322 upwards within FIG. 7), aileron panel 302 is raised. Conversely, as a force pushes on pushrod 322, aileron panel 302 is lowered.

The control mixer includes two bell cranks 306 and 310 and can be used to receive both a roll control input and an airbrake control input and combine both inputs to control a position of aileron panel 302. Within the control mixer, as either bell crank rotates it causes a position of the aileron panel to be adjusted. Both bell cranks may be rotated at the same time, or can be rotated individually. Because either bell crank can independently modify a position of the aileron panel, a control input that modifies a default position of the aileron panel (e.g., an air brake control input) can be connected to a first one of the bell cranks. As that bell crank rotates, the bell crank changes the default position of the aileron panel allowing the panel to act as an airbrake. A second control input (e.g., a roll control input) may then be connected to the second bell crank. As the second control input is activated, it causes the second bell crank to modify a position of the aileron panel, with the output of the second bell crank being superimposed over the output of the first bell crank. Accordingly, if an airbrake control is connected to the first bell crank and a roll control input is connected to the second bell crank, the roll control input would be superimposed over the air brake control input.

Referring to FIG. 7, a first control input is connected to control cable or rod 316. The control input may include, for example, an air brake control or a roll control input. Control rod 316 is connected to a first arm of bell crank 306. Bell crank 306 is mounted to wing 304 at bracket 308 and is configured to rotate about pivot point 326. As control rod 316 is pushed or pulled by the control input, bell crank 306 rotates about pivot point 326.

A second arm of bell crank 306 is connected to control arm 318. Control arm 318 is connected to bell cranks 306 and 310 at pivot points 328 and 330, respectively. As bell crank 306 rotates, bell crank 306 causes control arm 318 to move either closer or further away from aileron 302. When bell crank 306 rotates clockwise (in the orientation shown in FIG. 7), control arm 318 moves towards aileron panel 302. When bell crank 306 rotates counterclockwise, control arm 318 moves away from aileron panel 302.

Control arm 318 is connected to push rod 322. Accordingly, as control arm 318 moves away from or towards aileron panel 302, control arm 318 causes aileron panel 302 to be moved. As such, the control input connected to bell crank 306 can be used to control a position of aileron panel 302. If the control input is connected to an airbrake, for example, bell crank 306 may be used to control a default position of aileron panel 302.

The control mixer incorporates a second bell crank 310, also for controlling a position of aileron panel 302. A first arm of bell crank 310 is connected to control cable or rod 314. Bell crank 310 is mounted to wing 304 at pivot point 312. As control rod 314 is pushed or pulled by the connected control input, bell crank 310 rotates about pivot point 312.

A second arm of bell crank 310 is connected to control arm 318. As bell crank 310 rotates, bell crank 310 causes control arm 318 to move either closer or further away from aileron 302. When bell crank 310 rotates clockwise (in the orientation shown in FIG. 7), control arm 318 moves away from aileron panel 302. When bell crank 310 rotates counterclockwise, control arm 318 moves away from aileron panel 302.

In some cases, however, both control rods 316 and 314 are actuated at the same time. That may happen, for example, if a pilot should activate air braking while simultaneously providing a roll control input. In that case, both of bell cranks 306 and 310 may rotate at the same time. In response, the position of control arm 318 will be determined by the rotation of both bell cranks 306 and 310.

As such, the control input connected to bell crank 310 can be used to control a position of aileron panel 302. If the control input is connected to a roll control input, for example, bell crank 310 may be used to control a roll condition of the aircraft.

The present mechanical control mixer allows multiple control inputs to be combined into a single control output. For example, in the described aeronautical implementation, both roll control and air brake inputs are supplied to the control mixer. The control mixer combines both inputs to generate a single output that may be supplied to the aircraft's ailerons, for example. Using the present control mixer, a pilot can, while rolling or banking an aircraft, simultaneously apply the air brakes to slow the aircraft. In some implementations, sensors are integrated into the present control mixer to detect air braking and to simultaneously deploy the aircraft's flaps to compensate for upward pitch caused by the deflection of the ailerons.

While one or more embodiments of the present invention have been illustrated in detail, the skilled artisan will appreciate that modifications and adaptations to those embodiments may be made without departing from the scope of the present invention as set forth in the following claims.

The invention claimed is:

1. An aircraft, comprising:
  a mechanical control mixer coupled to the aircraft, the mechanical control mixer including:
    an axle mounted to a frame of the mechanical control mixer,
    a barrel configured to rotate about the axle, and
    a central rod disposed within the barrel, the central rod being configured to rotate with respect to the barrel;
  a roll control input connected to the central rod, the roll control input being configured to cause the central rod to rotate within the barrel;
  output control rods connected to the central rod, the output control rods being connected to at least one control surface of the aircraft; and
  an air brake input connected to the barrel, the air brake input being configured to cause the barrel to rotate about the axle to move at least one of the output control rods.

2. The aircraft of claim 1, wherein the air brake input is configured to move between a number of distinct positions.

3. The aircraft of claim 1, wherein the air brake input is configured to selectively deploy at least one flap of the aircraft.

4. The aircraft of claim 3, wherein an amount of flap deployment is determined by a position of the air brake input.

5. The aircraft of claim 1, wherein the air brake input is configured to cause the barrel to rotate about the axle to move at least two output control rods by an approximately equal distance.

6. The aircraft of claim 1, wherein at least one of the output control rods comprises a collapsible control rod.

7. A mechanical control mixer, comprising:
  a barrel connected to the mechanical control mixer, the barrel being configured to rotate within the mechanical control mixer in response to an air brake input; and
  a central rod disposed within the barrel, the central rod being configured to rotate within the barrel in response to a roll control input to control a position of at least one control surface of an aircraft.

8. The mechanical control mixer of claim 7, wherein the central rod is configured to connect to output control rods, the output control rods being connected to at least one control surface of the aircraft.

9. The mechanical control mixer of claim 8, wherein at least one of the output control rods comprises a collapsible control rod.

10. The mechanical control mixer of claim 8, wherein rotation of the barrel within the mechanical control mixer causes a force to be applied to the output control rods.

11. The mechanical control mixer of claim 7, wherein the air brake input is configured to move between a number of distinct positions.

12. The mechanical control mixer of claim 7, wherein the air brake input is configured to selectively deploy at least one flap of an aircraft.

13. The mechanical control mixer of claim 12, wherein an amount of deployment of the flap is determined by a position of the air brake input.

* * * * *